United States Patent
Del Pozo Abejon et al.

(10) Patent No.: US 6,644,713 B2
(45) Date of Patent: Nov. 11, 2003

(54) ACCESSORY ATTACHMENT SYSTEM FOR VEHICLE INTERIORS

(75) Inventors: Rubén Del Pozo Abejon, Valdcande (ES); José Manuel Bartolomé Alcalde, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 10/195,597

(22) Filed: Jun. 26, 2002

(65) Prior Publication Data

US 2003/0071475 A1 Apr. 17, 2003

Related U.S. Application Data

(63) Continuation of application No. PCT/ES01/00391, filed on Oct. 15, 2001.

(51) Int. Cl.⁷ .............................................. B60R 13/02
(52) U.S. Cl. .................... 296/39.1; 296/214; 296/146.7
(58) Field of Search ............................. 296/39.1, 146.7, 296/211, 214; 248/222.11, 224.8; 24/295; 411/85, 182; 403/13

(56) References Cited

U.S. PATENT DOCUMENTS

| | | | |
|---|---|---|---|
| 4,606,688 A | * 8/1986 | Moran et al. | 411/175 |
| 5,636,891 A | * 6/1997 | Van Order et al. | 296/37.7 |
| 5,857,735 A | * 1/1999 | Alonso Cuesta | 296/214 |
| 6,113,253 A | * 9/2000 | Yoshii et al. | 296/214 |
| 6,141,837 A | * 11/2000 | Wisniewski | 24/295 |
| 6,179,366 B1 | * 1/2001 | Hansz | 296/97.9 |
| 6,453,522 B1 | * 9/2002 | Romero Magarino et al. | 24/458 |

FOREIGN PATENT DOCUMENTS

| | | |
|---|---|---|
| ES | 2 107 334 | 12/1995 |
| ES | 2 107 378 | 11/1997 |
| WO | 98/47741 | 10/1998 |
| WO | 98/48179 | 10/1998 |
| WO | 00/40866 | 7/2000 |
| WO | 01/71201 | 9/2001 |

\* cited by examiner

*Primary Examiner*—Stephen T. Gordon
*Assistant Examiner*—Greg Blankenship
(74) *Attorney, Agent, or Firm*—Katten Muchin Zavis Rosenman

(57) ABSTRACT

The attachment system consists of a metal part with a base (1) having a central orifice for passage of a screw (9), by which are secured an accessory (10) and a lining (11) on said clip, in order to attach the entire assembly on the plate (8) of a vehicle body, with the attachment obtained by passing the clip through an orifice provided for such purpose on said plate (8). The clip has lateral flexible flaps (5) elbowed on their lower free ends and ending in corresponding tabs (7) that project and diverge outwards to define the structure for anchoring the clip on the orifice of the plate (8) after said flaps (5) pass through the aforementioned orifice, holding the accessory (10) and the lining (11) to the base (1) of the clip, so that these components are thus attached to the vehicle body. The tabs (7) project below the plane of the plate (8) and allow, by making independent the screw (9) and the accessory (10), to use a standard tool to bend the flaps (5) and extract the clip in its disassembly from the vehicle body.

3 Claims, 6 Drawing Sheets

ACCESSORY ATTACHMENT SYSTEM FOR VEHICLE INTERIORS

This application is a continuation of international application number PCTES01/00391, filed Oct. 15, 2001.

DESCRIPTION

OBJECT OF THE INVENTION

The present invention relates to an accessory attachment system for vehicle interiors, that is specifically intended for attaching both the lining and certain internal accessories of automobiles by means of structural characteristics that improve their stability in their mounting position and allow a simple disassembly without any damage to the metal clip or the part of the car body on which the attachment system is mounted.

The object of the invention is to provide the automobile sector with a new type of clip for attaching internal accessories and linings of automobiles, in which the clip is of the type comprising a metal clip with a base and sides in which flexible flaps are provided for attachment to the vehicle body, with the internal accessories attached to the clip by screws or the like, all of this such that a proper stability is achieved in the assembly position and so that disassembly is possible with the use of a standard tool.

BACKGROUND OF THE INVENTION

Attachment of interior vehicle accessories to the body mainly use metal or metal-plastic attachment means, with the latter comprising a metal part that defines the clip itself and a complementary plastic part that locks onto the latter to ensure the attachment, with this complementary part having means that allow a simple disassembly of the system. Attachment systems employing metal-plastic clips are described, for example, in the following patents of the Applicant: PCT WO98/48179, PCT WO98/47741, PCT WO00/40866 and PCT ES00/00106.

However, the scope of application of metal-plastic clips is limited when intending to attach certain accessories together with the lining that must withstand large loads, such as handles, airbag modules, etc.

As regards the metal clips, they generally consist of a metal part with a base from which emerge lateral extensions that converge towards each other, in which dies are made defining flexible lateral flaps, so that the part defined by the latter elements is passed through a fundamentally rectangular orifice made for such purpose in the supporting element that is the vehicle body, after passing through and holding the accessory to the lining of the vehicle, that is set against the inner face of the support determined by the vehicle body, and having a central orifice for passage of the screws for attaching the accessories to the clip. Said orifice will be hereunder referred to as the window.

Metal clips for attachment with a screw are described for example in Spanish Invention Patent 9401338 and the Addition to said Patent 9501623, from the Applicant.

Metal clips with a screw attachment are sturdy, yet have the disadvantage of requiring a special tool for disassembly, as if a standard tool is used the clip can be damaged or destroyed, and the vehicle body can also be damaged, as its support points on the chassis are not accessible.

In addition, it should be remarked that the stability of known clips is less than desirable when loads are applied in their working position, as they do not provide enough torsion strength between the lateral elastic flaps of the clip when tensions are applied that are perpendicular to the plane of support on the vehicle body part on which the system is mounted.

DESCRIPTION OF THE INVENTION

The clip object of the invention is metallic and attached by a screw, but includes certain novel properties that allow solving the aforementioned drawbacks.

More specifically, the first novel characteristic of the clip of the invention is that the part that comprises its base has arched grooves on its sides, representing material that is released in order to increase the size of the lateral flexible flaps of the metal clip nor in the part of the body where the attachment system is mounted, such that the end of said flexible flaps have central tabs that diverge outwards, which in the assembly position reach beyond the inner face of the vehicle body on which the attachment system is mounted, thereby making it possible to use a conventional tool as pliers or pincers on said tabs to bend the lateral flaps and allow the clip to pass through the window of the vehicle body and perform the extraction from said window.

A further novel characteristic of the clip of the invention is that the aforementioned tabs are also provided with recesses that allow it to be firmly engaged in the window of the car body, thereby improving the stability of the clip position and thus its strength against tensions and torsional motions.

Thus, the clip of the invention is characterised by a special shape of the part that comprises the base of the clip and of the lateral flaps, which in combination with the tabs allow dismantling the clip with conventional tools such as pliers or pincers, without permanently deforming the clip and without requiring complicated or specialised processes, without this affecting the strength of the clip. In addition, the tabs that allow the disassembly also allow by virtue of their special configuration to lock in place and thereby stabilise the clip in its working position.

The advantages provided by the clip can be summarised as follows:

Reduced disassembly time when the clip is deformed or when bodywork is performed and it is necessary to replace it.

Prevents bodywork deformations when removing the clip, as it is not necessary to apply force to the clip to deform it as in the conventional case.

The deformation caused on the bodywork is prevented, so that future assemblies can continue to be performed without problems.

Allows monitoring the state of the clip as it can be extracted without deforming it and its characteristics examined.

Allows recycling/reuse of the clips when they must be disassembled for replacing accessories or to work on the corresponding body area.

Improved tensile strength for accessory loads.

Improved strength against tilting of the accessories mounted with the clip of the invention.

DESCRIPTION OF THE DRAWINGS

As a complement of the description being made and in order to aid a better understanding of the characteristics of the invention, in accordance with a preferred embodiment, this description is accompanied by a set of drawings where for purposes of illustration and in a non-limiting manner the following is shown:

FIGS. 1A–1C shows a plan view, a side elevation view and a front elevation and sectional view of the clip object of the invention.

PREFERRED EMBODIMENT OF THE INVENTION

Figure 1:
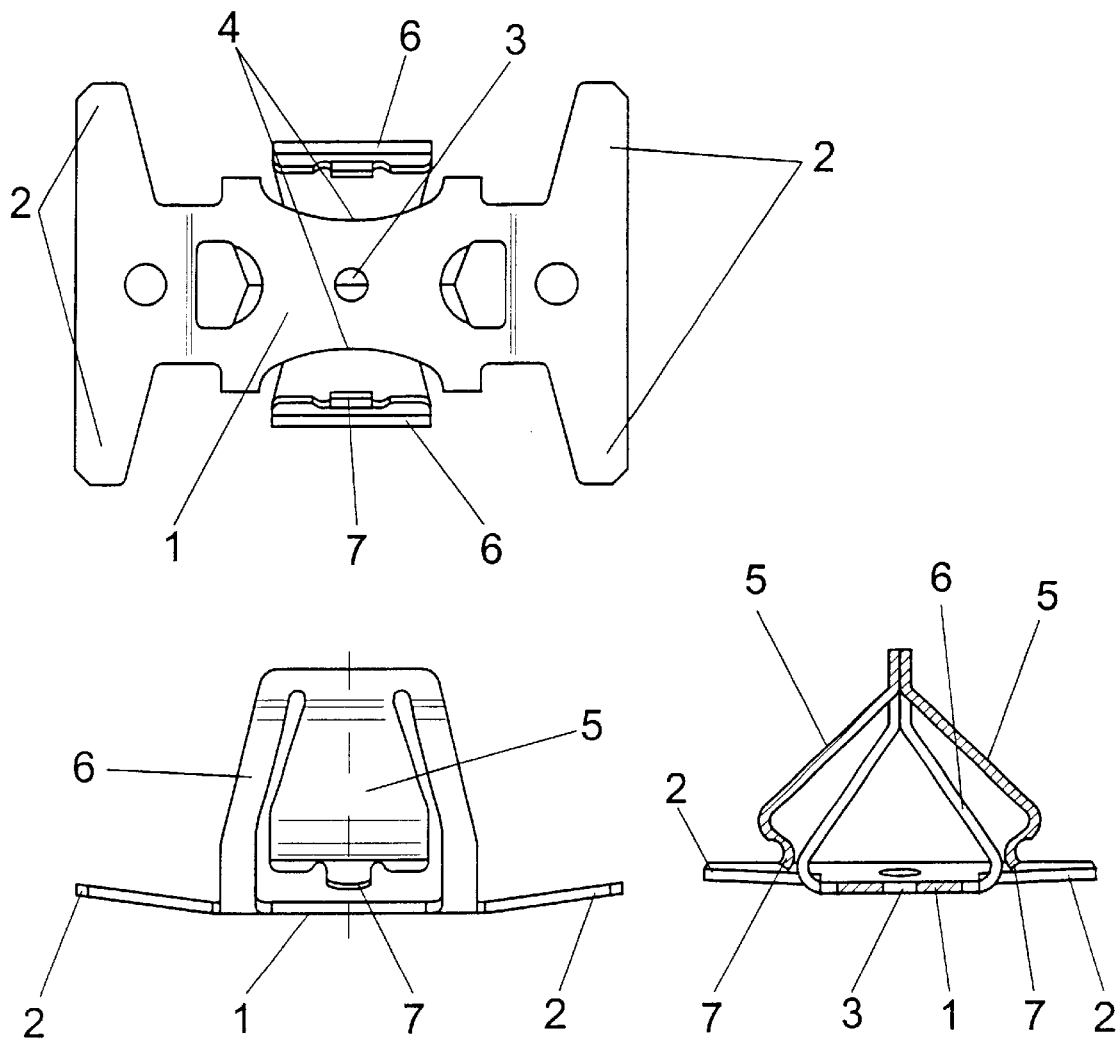
FIG. 1 shows a plan view, a side elevation view and a front elevation and sectional view of the clip object of the invention.

As may be seen in the above described figures, the clip of the invention is comprised of a metal part (1) in which is defined a generally rectangular base with a central orifice (3) for passage of the corresponding attachment screw, as will be explained below. The clip (1), and specifically the lateral edges of its base, are provided with arched grooves (4) that provide free material used to increase the length or width of the lateral elastic flaps (5) formed on the sides (6), conventionally, which flexible flaps (5) are provided after an arched elbow with a central tab (7). Said flaps (5) diverge, defining a medium that facilitates the extraction of the clip as will be described below.

As an option the clip may have end extensions (2), depending on the type and nature of the lining to be secured.

The clip thus obtained is attached to the corresponding support, which is determined by the plate (8) of the car body and which will naturally be the supporting element, by a screw (9) that is made to pass through the corresponding accessory (10) that will be attached to the lining (11) of the vehicle, so that the clip in addition to securing the accessory (10) also constitutes a means of attachment for the lining (11) under the support defined by the plate (8) of the vehicle.

The accessory (10) is provided on its sides with projecting guide elements (16), (16') that allow to ensure the correct relative position between said accessory and the metal clip during the assembly on the car body and during handling in operations prior to this. This prevents possible problems during the assembly and damage caused by a poor positioning of the components of the attachment system.

Figure 2:
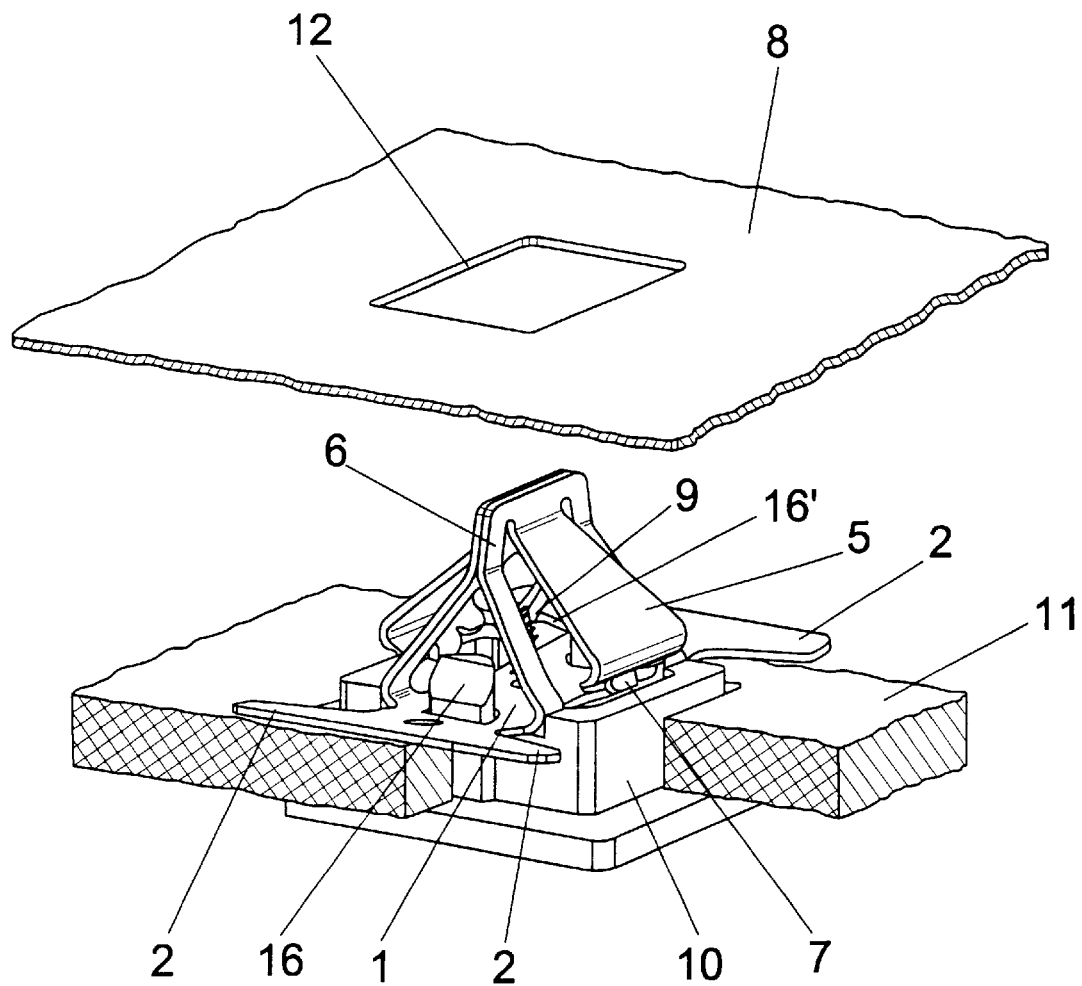
FIG. 2 shows a perspective view of the clip of the invention attached to an accessory and a corresponding liner for the interior of a vehicle (in this case on the roof, but which could also be on an upright woodwork, a door panel, etc.) all of this on a position for assembly on the window provided for such purpose on the corresponding plate of the car body that supports the clip.
Figure 3:
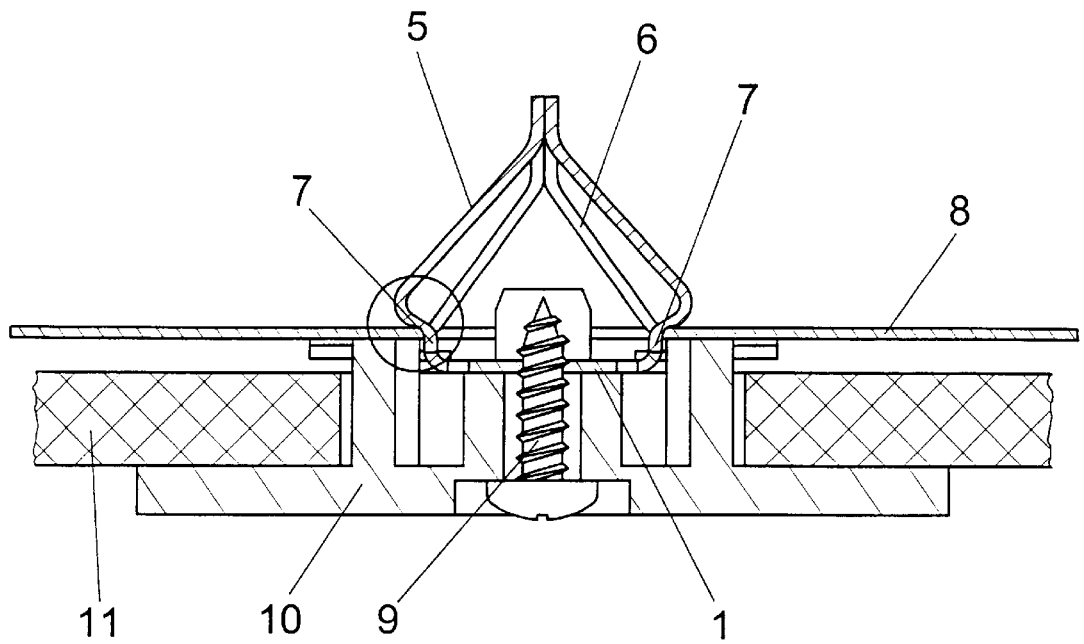
FIG. 3 shows a sectional view of the clip in its assembled position, securing the lining and an accessory onto the corresponding plate of the car body.
Figure 5:
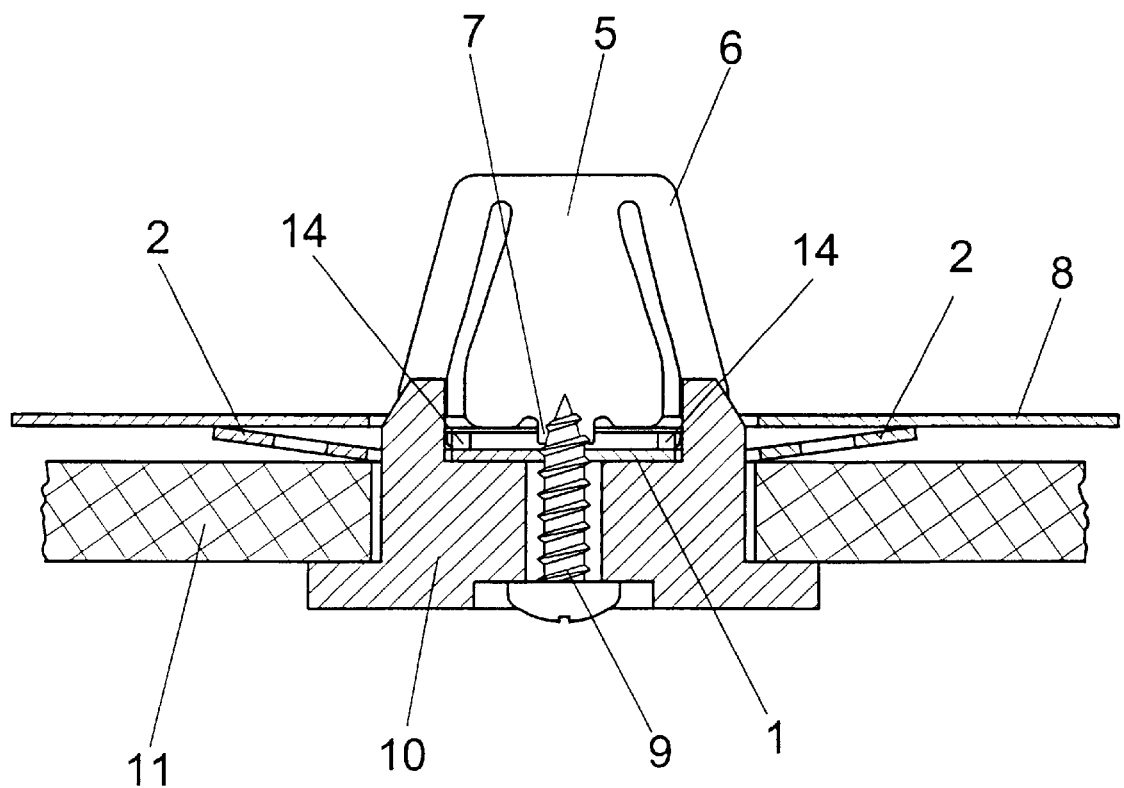
FIG. 5 shows a longitudinal section view of the assembly of FIG. 3.

Thus, once the clip (1) has been secured (1) by the screw (9) to the accessory (10) and the lining (11), as shown for example in FIGS. 2, 3, and 5, the final attachment on the support or plate (8) is obtained by anchoring said clip in the window (12) made for such purpose in said plate (8), so that when the clip is inserted upwards the flaps (5) bend upon contact with the side edges of the window (12), allowing the clip to pass and anchoring it in the window (12) with the accessory (10) and the lining (11) under the plate (8), as shown clearly in FIGS. 3 and 5.

Figure 4:
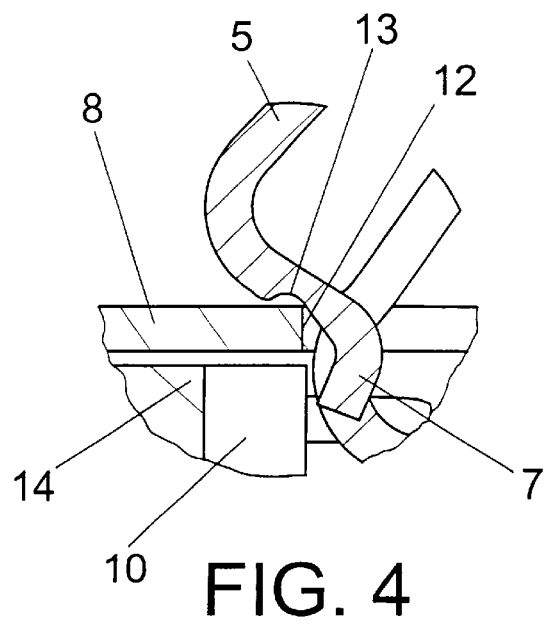
FIG. 4 shows an enlarged detail of the inset of the previous figure, corresponding to the recess of the tabs of the lateral flaps that, in combination with the supports of the accessory against the plate that acts as the body support determine a stabilisation means in the attachment of the assembly.

The anchor is further stabilised by a recess (13) made for such purpose in the outer face of the tabs (7), as in said recess (13) of both tabs is inserted the corresponding edge of the window (12) for passage and attachment of the clip, as shown clearly in the enlargement of FIG. 4. Additionally, the assembly is also stabilised by the supports (14) of the accessory (10) against the plate or support (8), and when the nature of the lining to be attached requires so, the end extensions (2) that project upwards as shown in FIG. 5.

Said supports (14) will act by distributing the loads or preventing the rotation angle of the system from its assembly position to exceed a certain critical value, after which the stability of the attachment would drastically diminish, and its shape will be different for each specific case as a function of the requirements and geometry of each situation.

Figure 6:
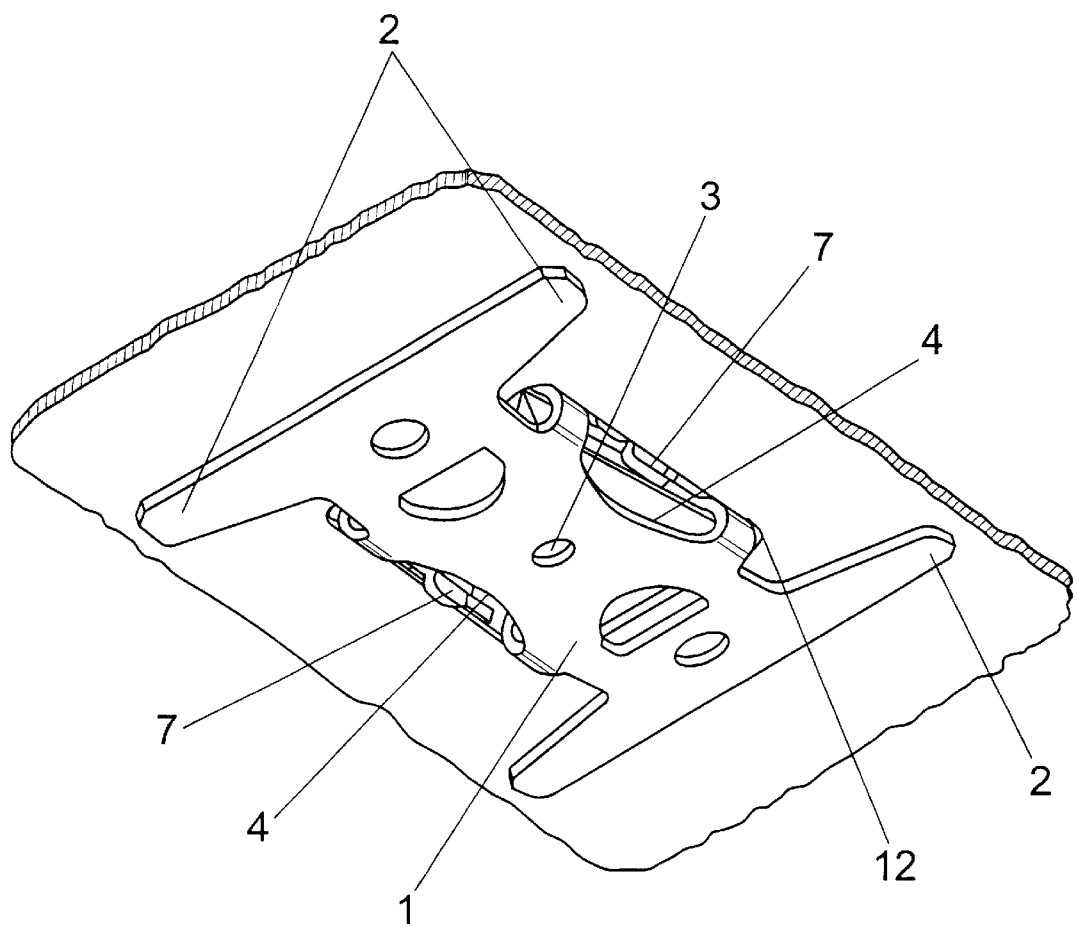
FIG. 6 shows a bottom view of the clip locked in the corresponding window of the car body, without the attachment screw and without the liner or the accessory it supports.
Figure 7:
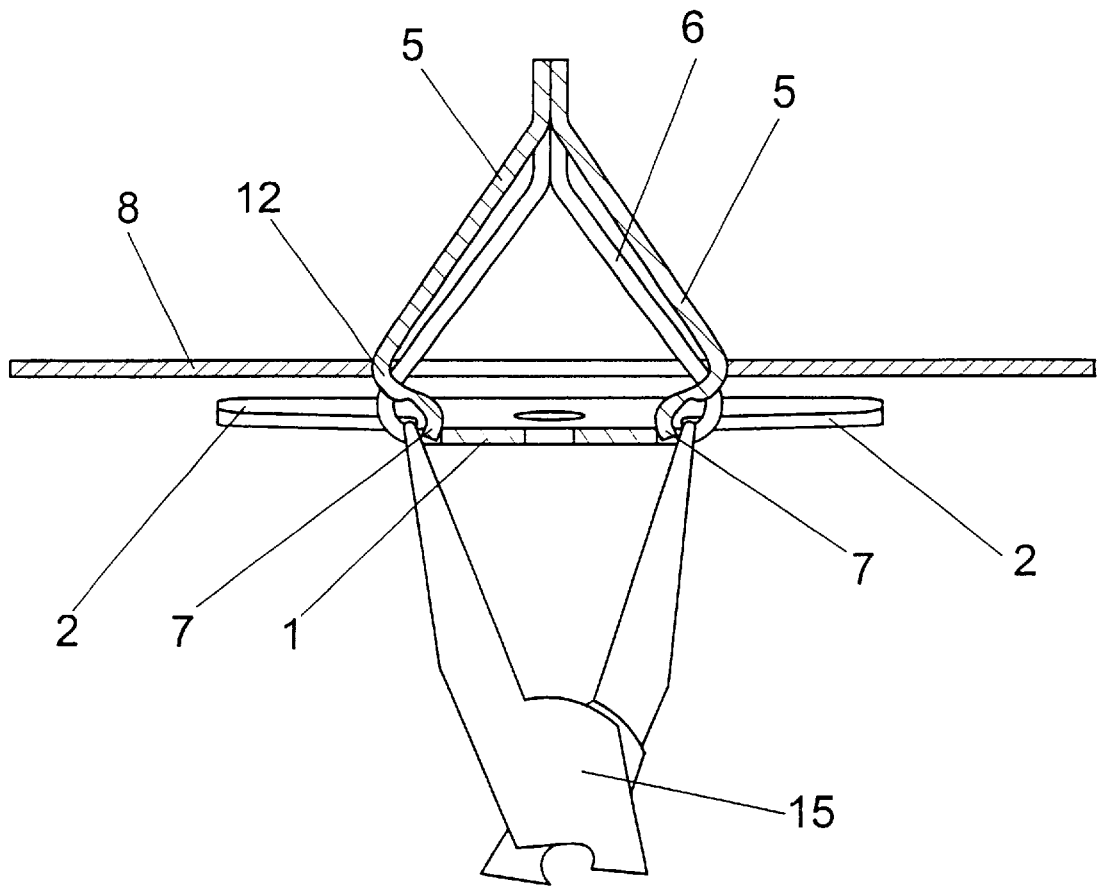
FIG. 7 shows a sectional view of the disassembly operation for the clip using a standard tool, such as pliers or pincers.

After the final assembly has been performed, as shown in FIGS. 3 and 5, the clip (1) can be disassembled after separating the screw (9) and the accessory (10), so that when this operation has been performed, as shown in FIG. 6, the tabs (7) will extend beyond the lower face of the housing (12), and thus will be easily accessible. After this, as shown in FIG. 7, the ends of pliers or pincers (15) can be used on the corresponding edges of the tabs (7) of the lateral flaps (5), pushing together the tabs (7) and thus bending the lateral flaps (5) to allow them to pass through the window (12) of the support or plate (8), which will result in the extraction and thus the disassembly of the clip (1), without causing any deformation of the clip nor the plate (8), allowing its later reuse and assembly without any problems.

What is claimed is:

1. Accessory attachment system for vehicle interiors for attaching an accessory and a lining to a plate that acts as a support and that is part of a body of an automobile comprising:

a clip comprised of a metal part with a basically rectangular outline provided with lateral end extensions that in the accessory attachment system and attachment rest on an inner face of the support defined by the plate of the vehicle body, said metal part of the clip being provided with sides in which are defined by dieing two flexible flaps that allow the clip to pass through an opening made for such purpose in the aforementioned plate of the automobile body, in order to secure the clip and to attach the accessory and the lining, after the accessory and lining are secured by screws to a base of the metal part of the clip, wherein lateral edges of the base of the clip are provided with corresponding arched grooves used to increase the size of the flexible flaps so that the bottom end of said flaps extends beyond the edges of a window of the plate in which the clip is anchored, said flexible flaps having arched elbows the edges of which end as arched tabs that diverge outwards, thus allowing the flaps to retain the clip after it passes through the window of the plate of the vehicle body.

2. Accessory attachment system according to claim 1, wherein the tabs, after the screw and the corresponding accessory have been removed, project our of bottom of a plane of the plate of the vehicle body, allowing to use on said tabs a tool for bending the lateral flaps to allow the clip to pass outwards and the corresponding assembly of the clip to the window for securing it.

3. Accessory attachment system according to claim 1, wherein the tabs of the flexible flaps are provided with a recess for engaging a corresponding edge that determines the perimeter of the window when it is assembled, so that this effect and joint action of the clip thus mounted and the accessory, the latter being assembled from an exposed side of the lining and passing through it towards the plate, so that it can act as an additional support on the car body whenever there are forces acting on the system that tend to displace it, resting on the opposite side of the lining and thus providing an anchoring of the system on said window.

* * * * *